United States Patent
Bae et al.

(10) Patent No.: US 9,948,392 B2
(45) Date of Patent: *Apr. 17, 2018

(54) APPARATUS AND METHOD FOR GENERATING VISIBLE SIGNAL ACCORDING TO AMOUNT OF DATA TRANSMISSION IN VISIBLE LIGHT COMMUNICATION SYSTEM

(71) Applicant: Samsung Electronics Co., Ltd., Gyeonggi-do (KR)

(72) Inventors: Tae-Han Bae, Seoul (KR); Jae-Seung Son, Gyeonggi-do (KR); Eun-Tae Won, Seoul (KR); Do-Young Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 30 days.

This patent is subject to a terminal disclaimer.

(21) Appl. No.: 15/064,231

(22) Filed: Mar. 8, 2016

(65) Prior Publication Data
US 2016/0191160 A1    Jun. 30, 2016

Related U.S. Application Data

(63) Continuation of application No. 12/776,087, filed on May 7, 2010, now Pat. No. 9,281,894.

(30) Foreign Application Priority Data

May 8, 2009  (KR) .......... 10-2009-0040396
Jan. 15, 2010 (KR) .......... 10-2010-0003734

(51) Int. Cl.
*H04B 10/116*    (2013.01)
*H04B 10/114*    (2013.01)

(52) U.S. Cl.
CPC ....... *H04B 10/116* (2013.01); *H04B 10/1149* (2013.01)

(58) Field of Classification Search
CPC ..................... H04B 10/114–10/116
See application file for complete search history.

(56) References Cited

U.S. PATENT DOCUMENTS 6,546,014 B1    4/2003    Kramer et al.
7,463,674 B2    12/2008   Woolf et al.
(Continued)

FOREIGN PATENT DOCUMENTS

CN    1838681       9/2006
CN    101309360     11/2008
(Continued)

OTHER PUBLICATIONS

European Search Report dated Dec. 4, 2015 issued in counterpart application No. 10772289.4-1860, 6 pages.

*Primary Examiner* — Shi K Li
(74) *Attorney, Agent, or Firm* — The Farrell Law Firm, P.C.

(57) ABSTRACT

A method and apparatus are provided for generating a visible light signal according to an amount of data transmission in a first Visible Light Communication (VLC) device. The method includes determining a ratio of an amount of data that has been received from a second VLC device to a total amount of data to be received; determining a visible light signal pattern corresponding to the ratio; generating a visible light signal corresponding to the visible light signal pattern; and outputting the visible light signal.

18 Claims, 11 Drawing Sheets

(56) References Cited

U.S. PATENT DOCUMENTS

| | | |
|---|---|---|
| 7,564,894 B2 | 7/2009 | Woolf et al. |
| 8,005,366 B2 | 8/2011 | Shin et al. |
| 8,019,229 B2 | 9/2011 | Fujiwara |
| 8,019,230 B2 | 9/2011 | Choi et al. |
| 8,054,346 B2 | 11/2011 | Numata |
| 9,281,894 B2 * | 3/2016 | Bae .................. H04B 10/1149 |
| 2005/0132062 A1 | 6/2005 | Halme |
| 2006/0084479 A1 | 4/2006 | Kim et al. |
| 2006/0214815 A1 | 9/2006 | Komatsu |
| 2007/0147843 A1 | 6/2007 | Fujiwara |
| 2008/0094244 A1 | 4/2008 | Oh et al. |
| 2008/0131140 A1 | 6/2008 | Shin et al. |
| 2009/0010654 A1 | 1/2009 | Shin et al. |
| 2009/0022496 A1 | 1/2009 | Shin et al. |
| 2009/0028558 A1 | 1/2009 | Choi et al. |
| 2009/0185802 A1 | 7/2009 | Choi et al. |
| 2009/0208221 A1 | 8/2009 | Sasai |
| 2010/0034540 A1 | 2/2010 | Togashi |
| 2010/0162139 A1 | 6/2010 | Beebe et al. |
| 2010/0267274 A1 | 10/2010 | McNally et al. |
| 2010/0318392 A1 | 12/2010 | Cassels et al. |

FOREIGN PATENT DOCUMENTS

| | | |
|---|---|---|
| JP | 2001-309031 | 11/2001 |
| JP | 2004-282512 | 10/2004 |
| JP | 2007-180826 | 7/2007 |
| JP | 2008-292397 | 12/2008 |
| JP | 2008-294971 | 12/2008 |
| KR | 10-0770918 | 10/2007 |
| KR | 10-2008-0049506 | 6/2008 |
| KR | 10-2008-0104663 | 12/2008 |
| KR | 10-2008-0108732 | 12/2008 |
| KR | 10-2009-0004071 | 1/2009 |
| KR | 10-2009-0005520 | 1/2009 |
| KR | 10-2009-0005794 | 1/2009 |
| KR | 10-2009-0008894 | 1/2009 |
| KR | 10-2009-0011203 | 2/2009 |
| RU | 2 292 654 | 1/2007 |
| WO | WO 2008/010274 | 1/2008 |
| WO | WO 2008/047996 | 4/2008 |
| WO | WO 2008/050729 | 5/2008 |
| WO | WO 2008/129742 | 10/2008 |
| WO | WO 2014/012126 | 1/2014 |

\* cited by examiner

APPARATUS AND METHOD FOR GENERATING VISIBLE SIGNAL ACCORDING TO AMOUNT OF DATA TRANSMISSION IN VISIBLE LIGHT COMMUNICATION SYSTEM

PRIORITY

This application is a Continuation of U.S. Pat. No. 12/776,087, which was filed in the U.S. Patent and Trademark Office on May 7, 2010, issued as U.S. Pat. No. 9,281,894 on Mar. 8, 2016, and claims priority under 35 U.S.C. § 119(a) to Korean Patent Application Serial Nos. 10-2009-0040396 and 10-2010-0003734, which were filed in the Korean Intellectual Property Office on May 8, 2009 and Jan. 15, 2010, respectively, the entire disclosure of each of which is hereby incorporated by reference.

BACKGROUND OF THE INVENTION

1. Field of the Invention

The present invention relates generally to a Visible Light Communication (VLC) system, and more particularly, to a method and apparatus for generating a visible signal to enable a user to confirm the amount of data transmission while receiving data.

2. Description of the Related Art

VLC refers to a wireless communication technique using light within a visible light wavelength region. Recently, with the spread of Light Emitting Diodes (LEDs), extensive research is being conducted into VLC technologies. In the general VLC system, a transmitter sends visible light using an LED or a Laser Diode (LD) as a light source and a receiver processes the visible light using a Photo Detector (PD) etc Infrared communications use similar techniques to those of a VLC system. FIG. 1 is a flow chart illustrating a data transmission process in a general wireless communication system using infrared rays. As illustrated in FIG. 1, wireless communication using infrared rays includes an infrared communication activation process 101, an external infrared communication device search process 102, a communication scheme determination process 103, a connection process 104, a data transmission process 105, a connection release determination process 106, and a communication connection release process 107. Through such a series of processes, a user arranges a communication link by directing light to an infrared communication device.

A data transmission scheme between a transmitter and a receiver that perform infrared communication is described with reference to FIG. 2. FIG. 2 is a diagram illustrating a data transmission scheme in a data link layer of an infrared wireless communication system. A transmitter 201 transmits data to a receiver 202 in step 203. If the data is successfully received, the receiver 202 transmits an ACKnowledgement (ACK) signal as a response to the reception of the data in step 204. In this way, data transmission is performed between the transmitter 201 and the receiver 202. However, since a user cannot directly confirm a communication state or communication channel state between devices, even though a link is disconnected in the middle of transmitting data between communication devices after the communication link is established, the user has no way of knowing the status of the communication link state.

VLC which is being currently developed is different from infrared communication in that it considers such a problem. Namely, the most distinctive feature of VLC contrasted with infrared communication is that VLC enables a user to be able to directly confirm a link state by using a light source of a visible light band. Therefore, a user can control the direction of a light signal so that light is directed to a target device even in the process of forming the communication link.

Since infrared communication uses wavelengths of the invisible light band, a communication link is invisible to a user and therefore a user cannot know a situation in which communication is performed. However, VLC uses a light source of a visible light band so that a user can visually confirm a communication channel state. In a communication scheme using visible light as a light medium, there is a need for methods using visible light in various ways and, in this case, the convenience of a user should be first considered. For example, if a user can intuitively know a transmission degree of data, that is, the transmission amount or transmission ratio of data while data is transmitted and received, the convenience of a user will increase.

SUMMARY OF THE INVENTION

An aspect of the present invention is to address at least the above-mentioned problems and/or disadvantages and to provide at least the advantages described below.

Accordingly, an aspect of the present invention provides an apparatus and method for enabling a user to confirm the amount of data transmission in data communication between two or more VLC devices using VLC.

In accordance with an aspect of the present invention, a method is provided for generating a visible light signal according to an amount of data transmission in a first Visible Light Communication (VLC) device. The method includes determining a ratio of an amount of data that has been received from a second VLC device to a total amount of data to be received; determining a visible light signal pattern corresponding to the ratio; generating a visible light signal corresponding to the visible light signal pattern; and outputting the visible light signal.

In accordance with another aspect of the present invention, a first Visible Light Communication (VLC) device is provided for generating a visible light signal according to an amount of data transmission. The first VLC device includes a VLC receiver configured to receive data through the VLC; a data processor configured to determine a ratio of an amount of data that has been received from a second VLC device to a total amount of data to be received, determine a visible light signal pattern corresponding to the ratio, and generate the visible light signal corresponding to the visible light signal pattern; and a VLC transmitter configured to output the visible light signal.

In accordance with another aspect of the present invention, a method is provided for generating a visible light signal according to an amount of data transmission in a first Visible Light Communication (VLC) device. The method includes determining a ratio of an amount of data that has been transmitted to the second VLC device to a total amount of data to be transmitted; determining a visible light signal pattern corresponding to the ratio; generating a visible light signal corresponding to the visible light signal pattern; and outputting the visible light signal.

In accordance with another aspect of the present invention, a first Visible Light Communication (VLC) device is provided for generating a visible light signal according to an amount of data transmission. The first VLC device includes a VLC transmitter configured to transmit data to a second VLC device through the VLC; and a data processor configured to determine a ratio of an amount of data that has been transmitted to the second VLC device to a total amount of data to be transmitted, determine a visible light signal pattern corresponding to the ratio, generate a visible light signal corresponding to the visible light signal pattern, and control the VLC transmitter to output the visible light signal.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

The present invention provides a method for informing a user of the amount of data transmitted in a VLC device. To this end, the method includes acquiring the total amount of the data, determining a visible light output pattern corresponding to the ratio of the amount of transmitted/received data to the total amount of data, and generating visible light of the determined output pattern.

While data transmission is in process, the amount of transmitted data is increased. Then visible light of gradually varying output patterns may be generated so that a user can intuitively confirm the amount of data transmission. The present invention provides a method for generating visible light having gradually varying output patterns according to the amount of received data. In other embodiments, methods using different colors and flickering speeds as the gradually varying visible light output patterns are described in detail. In an alternative embodiment, a method using the intensity, that is, brightness, of visible light as the visible light output patterns is described in detail.

Figure 1:
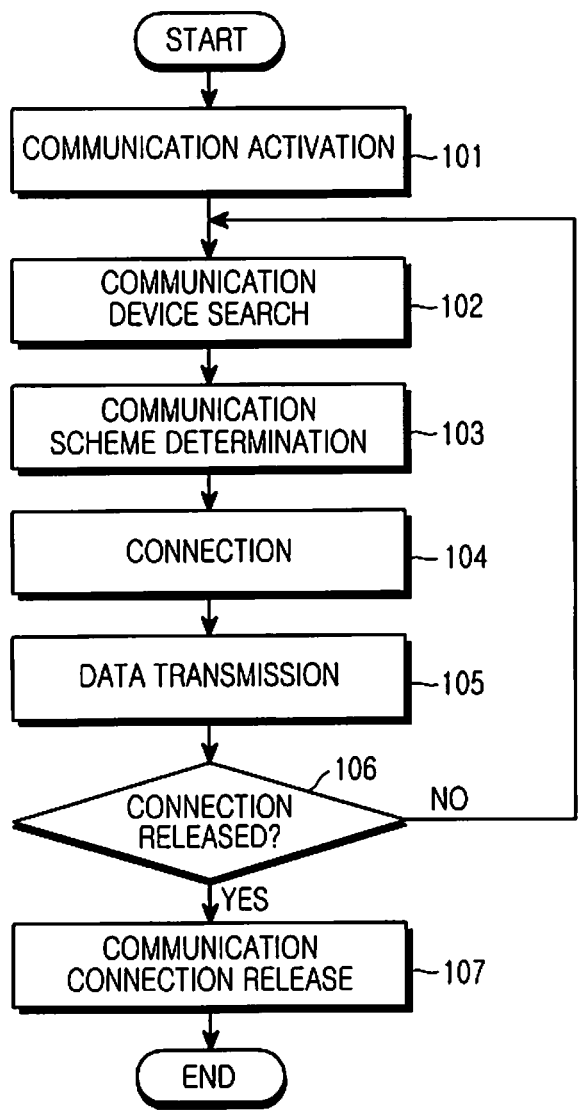
FIG. 1 is a flow chart illustrating a data transmission process in a general wireless communication system using infrared rays.
Figure 2:
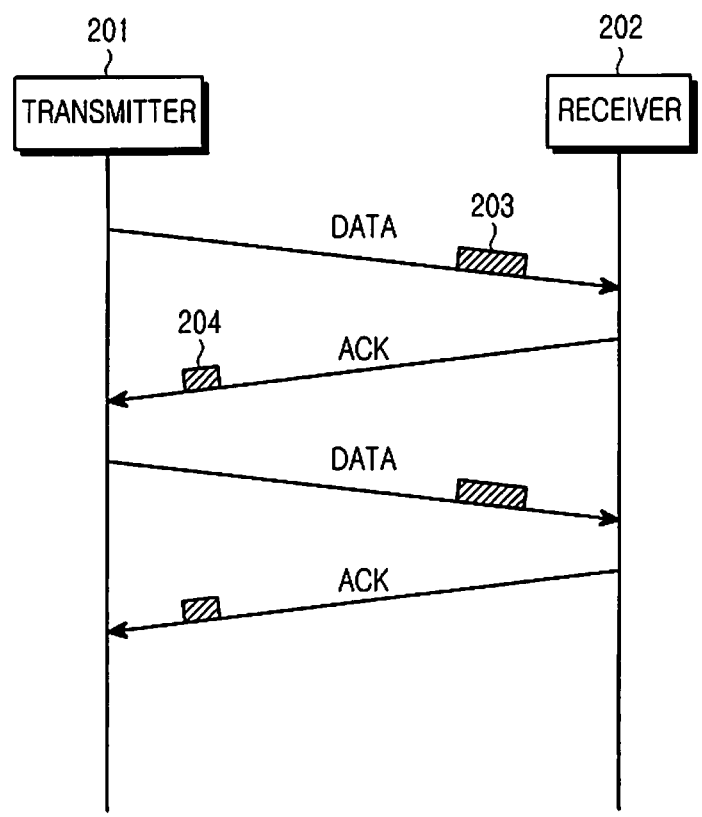
FIG. 2 is a diagram illustrating a data transmission scheme in a data link layer of an infrared wireless communication system.
Figure 3:
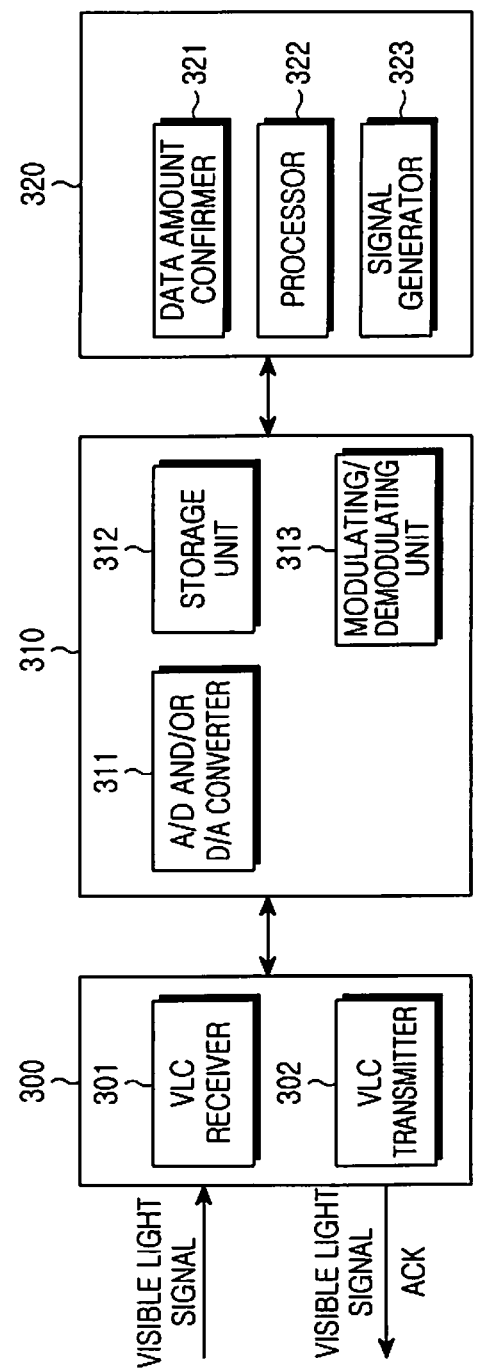
FIG. 3 is an internal block diagram of a VLC device according to an embodiment of the present invention.

A structure and operation of a VLC device in a VLC system having the above-described function are described with reference to FIG. 3. FIG. 3 is an internal block diagram of a VLC device according to an embodiment of the present invention.

Referring to FIG. 3, a VLC device includes a VLC transceiver 300, a VLC controller 310, and a data processor 320 for confirming the amount of data and generating a signal corresponding to the amount of data. A transmitting-side VLC device and a receiving-side VLC device may have the same constituent parts and each of them may generate different visible light output patterns depending on the amount of data according to an embodiment of the present invention.

More specifically, the VLC transceiver 300 includes a VLC receiver 301 and a VLC transmitter 302. The VLC receiver 301 receives data through visible light from the transmitting-side VLC device. The VLC transmitter 302 transmits desired data to the receiving-side VLC device or generates an ACK signal as a response to the received data, a signal for informing the transmitting-side VLC device of the amount of the received data, a visible light signal of different colors, and a visible light signal of different brightness. The VLC receiver 301 may include a PD which converts an externally input visible light signal into an electric signal. The VLC transmitter 302 may include a visible light LED. The VLC receiver 301 transmits a visible light signal received from the transmitting-side VLC device to the controller 310 and transmits a signal input from the controller 301 to the transmitting-side VLC device through the VLC transmitter 302.

The controller 310 includes an Analog-to-Digital (A/D) converter and/or a Digital-to-Analog (D/A) converter 311, a storage unit 312 and a modulating/demodulating unit 313.

The A/D and/or D/A converter 311 converts data received from the VLC receiver 301 into a digital signal or converts a digital signal which is to be transmitted into an analog signal. Information about the total amount of received data is converted into a digital signal and then is temporarily stored in the storage unit 312. When data is transmitted, information about the amount of transmitted data is also stored in the storage unit 312.

The storage unit 312 stores mapping information between a data ratio and color information according to an embodiment of the present invention. The storage unit 312 stores mapping information between a data ratio and a flickering interval according to another embodiment of the present invention. The storage unit 312 stores mapping information between a data ratio and the brightness (or intensity) of visible light according to a further embodiment of the present invention. For example, as a data ratio approaches 100%, mapping information indicating that a flickering interval of visible light is gradually increased or decreased is stored in the storage unit 312. In this case, a step at which a data ratio is divided may be determined according to colors emitted by an LED. Alternatively, a step at which the brightness of visible light that a user can recognize becomes brighter or darker may be determined according to a data ratio. For example, if the LED emits three colors, a data ratio may be divided into three steps corresponding to the three colors or may be divided into three or more steps using a combination of the three colors. Different colors, flickering speeds, or brightness of visible light is mapped to respective steps and the mapped information is stored in the storage unit 312.

The data ratio refers to the ratio of the amount of transmitted or received data to the total amount of data. The modulating/demodulating unit 313 demodulates the converted data into data suitable for a VLC scheme.

The data processor 320 generates a control signal so as to transmit data and simultaneously to generate visible light of an output pattern corresponding to a data ratio during data transmission. Alternatively, the data processor 320 may generate a control signal so as to transmit a visible light pattern signal at a data non-transmission interval during data transmission.

Moreover, the data processor 320 transmits an ACK signal whenever data is received and simultaneously generates a control signal so as to generate visible light of an output pattern corresponding to a data ratio. Alternatively, the data processor 320 performs a control function so as to transmit the ACK signal irrespective of the generation of visible light of an output pattern corresponding to a data ratio when generation of the ACK signal is delayed.

In the receiving-side VLC device, the data processor 320 generates an ACK signal as a response whenever data is received and simultaneously performs a control function so as to transmit information about the amount of received data stored in the storage unit 312 to the transmitting-side VLC device. The data processor 320 includes a data amount confirmer 321, a processor 322, and a signal generator 323.

The data amount confirmer 321 confirms the amount of data stored in the storage unit 312 to determine the amount of currently transmitted or received data and provides the result to the processor 322. The processor 322 confirms the ratio of the amount of transmitted or received data to the total amount of data. The processor 322 determines a visible signal pattern or a color variation displayed by visible light correspondingly to the confirmed ratio based on the mapping information stored in the storage unit 312. The signal generator 323 generates a control signal for the visible signal pattern or color variation and transmits the control signal to the VLC transmitter 302. The VLC transmitter 302 generates visible light of different colors according to the control signal by using an LED etc.

For example, the signal generator 323 may generate a signal of a predetermined color or a signal of a given flickering pattern according to the data ratio confirmed by the processor 322. Namely, the signal generator 323 changes a color or pattern of a signal generated according to a variation of the amount of data.

It should be noted that the above-described VLC device can generate at both the transmitting side and the receiving side. Therefore, the VLC device shown in FIG. 3 may further include a display for receiving a visible signal and displaying the visible signal using an LD, an LED, or an array thereof. Through the above-described constituent elements, the cases where the VLC device generates a visible signal, using the amount of transmitted data, using the amount of received data, and using the amount of data received from a receiving device after transmitting data have been described.

A visible signal transmission process depending on a variation of the amount of data transmission according to an embodiment of the present invention is described with reference to FIGS. 4A and 4B. Hereinafter, a transmitting-side VLC device will be referred to as a first device 401 and a receiving-side VLC device will be referred to as a second device 402.

Figure 4A:
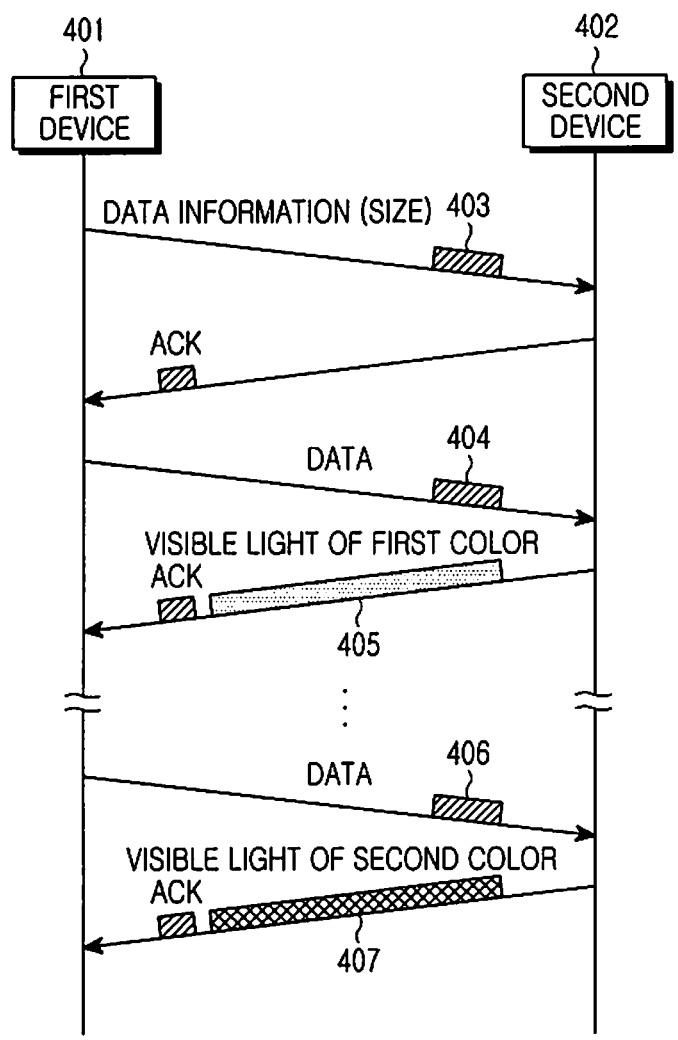
FIGS. 4A and 4B are diagrams illustrating visible signal transmission processes depending on a variation of the amount of data transmission according to an embodiment of the present invention.

Referring to FIG. 4A, the first device 401 transmits data information, for example, information about the total size (or amount) of data before transmitting actual data in step 403. Upon receiving an ACK signal as a response to the transmission of the data information, the first device 401 transmits data to the second device 402 through a visible light signal in step 404. Alternatively, the first device 401 may determine the amount of the transmitted data, directly determine a visible light output pattern which is to be generated by the second device 402, and inform the second device 402 of the determined visible light output pattern. In this case, the first device 401 may inform a plurality of receiving-side VLC devices of the visible light output pattern.

Then the second device 402 transmits an ACK signal to the first device 401 and simultaneously generates visible light of a first color mapped to the amount of received data in step 405. Alternatively, the second device 402 may generate visible light of the visible light output pattern determined by the first device 401. Here, the second device 402 may confirm the remaining transmission amount of data, that is, the amount of data which is to receive based on the information about the total size of data. Accordingly, the amount of received data may be replaced with the remaining transmission amount of data.

Since a data ratio is varied as data transmission is in progress as in step 406, the second device 402 generates visible light of a second color corresponding to the varied data ratio in step 407. In this way, since the ratio of received data is increased while data transmission is in progress, the second device 402 gradually varies colors according to the varied data ratio and generates visible light of the varied colors. Thus, a user is informed of the amount of data transmission using visible light according to the ratio of the amount of received data to the total amount of data. Therefore, the user can visually confirm the amount of data transmission.

The ACK signal and visible light may be generated by a process different from that shown in FIG. 4A. This transmission process of the ACK signal and visible light is shown in FIG. 4B and the basic data flow in FIG. 4B is the same as the flow in FIG. 4A. Referring to FIG. 4B, steps 413 and 414 are the same as steps 403 and 404 in FIG. 4A. However, if there is delay in the second device 402 in generating the ACK signal, the second device 402 generates visible light of a third color in step 415 irrespective of the ACK signal. As data transmission is in progress as in step 416, the second device 402 generates visible light of a fourth color in step 417. In this case, the visible light of a corresponding color may continue to be generated until the ACK signal is generated.

Figure 4B:
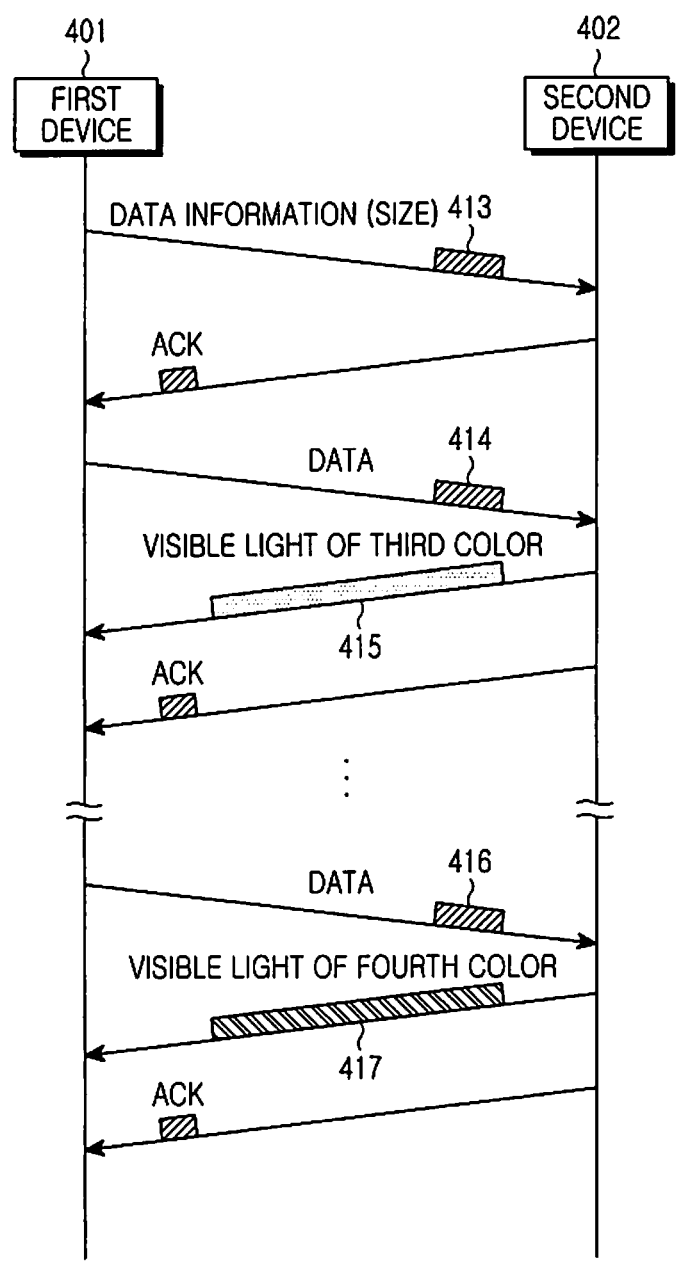

As described above, the case where visible light of different colors is gradually transmitted according to a result of comparison of the total amount of data with the amount of currently received data has been described in conjunction with FIGS. 4A and 4B. The different colors can be generated by controlling the intensity of Red (R), Green (G) and Blue (B) colors.

This is described with reference to FIG. 5 which illustrates a transmitting-side VLC device and a receiving-side VLC device in a VLC system according to an embodiment of the present invention.

In VLC, various colors may be produced by mixing three colors of R, G and B. To this end, currents or voltages applied to R, G and B LEDs are controlled. A controller 501 of the transmitting-side VLC device generates signals for controlling colors which can be emitted by LEDs. The color control signals are converted into analog signals through D/A converters 502. The analog signals control LEDs 503 of three colors. In this way, the controller 501 generates the control signals for control the respective LEDs 503 so as to generate visible light of different colors as the amount of received data is increased.

In the receiving-side VLC device, visible light of different colors is received through the PDs 504 and is converted into digital signals through A/D converters 505. The converted digital signals are input to a controller 506.

In the receiving-side VLC device, a specific color may be selectively used to maintain an ACK signal which is a response to a transmitted signal. In this case, a color is varied by adjusting the intensity of a color except for colors used for signal transmission. Then a receiver of the transmitting-side VLC device may receive only a desired color by using a signal reception filter. In this case, the color used in order to maintain the ACK signal should not be used for other purposes. A device for receiving the ACK signal may use a filter to discriminate the color used for the ACK signal. To this end, the PD 504 may use a filter for discriminating different colors.

Figure 5:
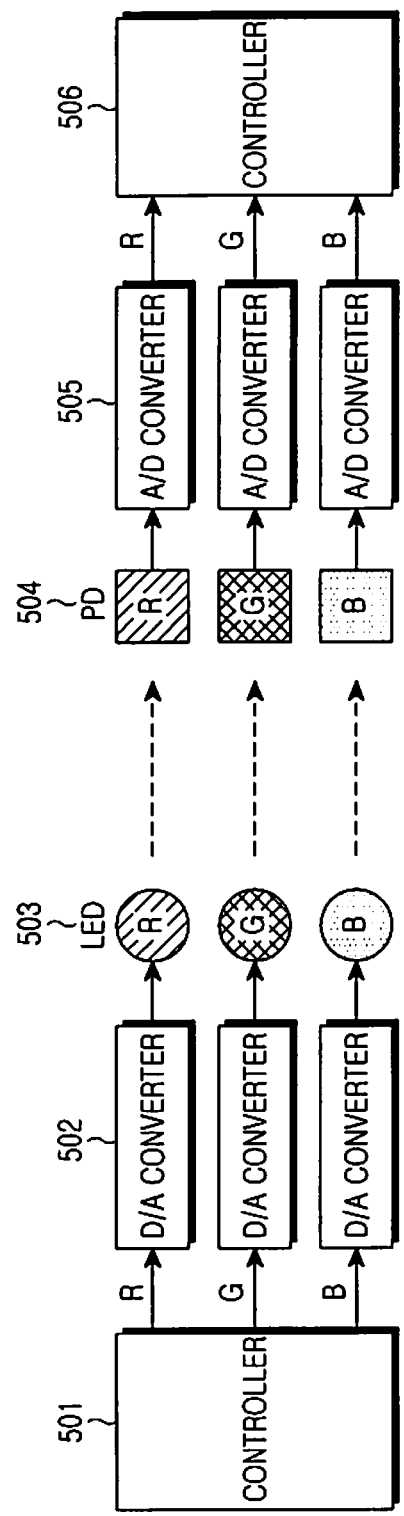
FIG. 5 is a block diagram of a transmitting-side VLC device and a receiving-side VLC device in a VLC system according to an embodiment of the present invention.

FIG. 5 illustrates one embodiment using three colors of R, G and B and the same description may be applied to different LEDs, other than the R, G and B LEDs, used in an actual VLC device.

In the above-described embodiment of the present invention, a process using visible light of different colors has been described as a method for informing a user of a variation of the amount of data transmission. In another embodiment of the present invention, the method may use different flickering speeds, that is, different flickering intervals of visible light.

Visible signal transmission processes depending on a variation of the amount of data transmission according to another exemplary embodiment of the present invention are described with reference to FIGS. 6A and 6B.

Figure 6A:
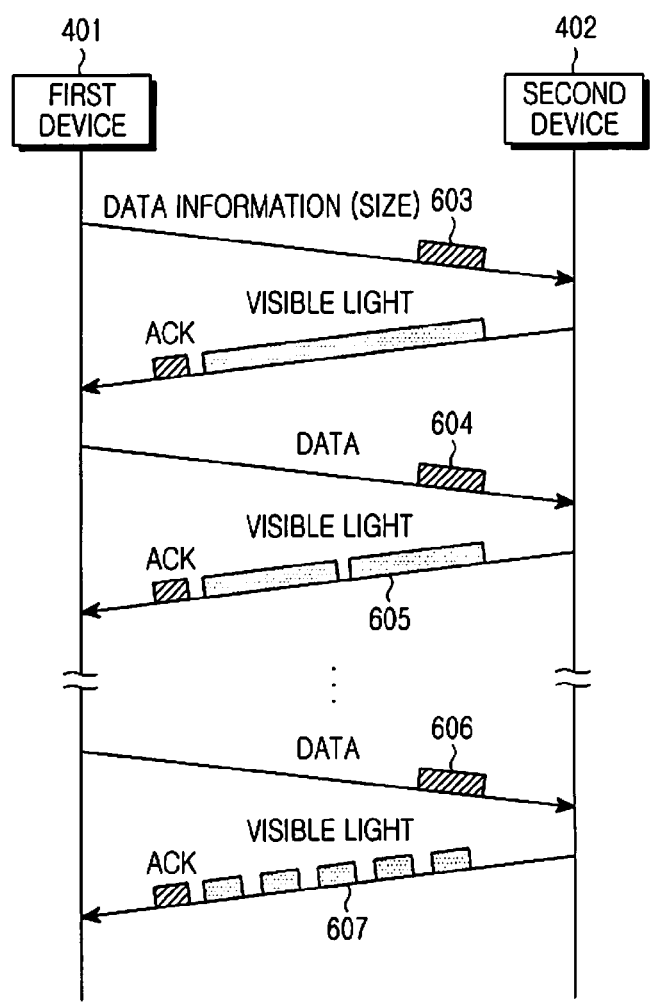
FIGS. 6A and 6B are diagrams illustrating visible signal transmission processes depending on a variation of the amount of data transmission according to another embodiment of the present invention.

Referring to FIG. 6A, steps 603 and 604 are the same as steps 403 and 404 in FIG. 4A and therefore, a detailed description thereof is omitted. In FIG. 6A, a flickering interval is gradually varied according to the amount of received data based on the total amount of data. Upon receiving data in step 604, the second device 402 determines a flickering interval mapped to the amount of received data and generates visible light at the determined flickering interval together with an ACK signal as a response to data reception in step 605. Upon receiving the next data in step 606, since the amount of received data is increased, the second device 402 determines a flickering interval mapped to the increased amount of data. If the amount of data reaches a data ratio of a next step at which the flickering interval should be adjusted, the second device 402 generates visible light at an adjusted flickering interval of the next step as in step 607. In this way, since the flickering interval is gradually varied, a user can confirm a variation of a data transmission rate. For example, if the data transmission rate approaches 100% while data is transmitted, a flickering speed may be faster or slower to cause a user to confirm the transmission rate.

Figure 6B:
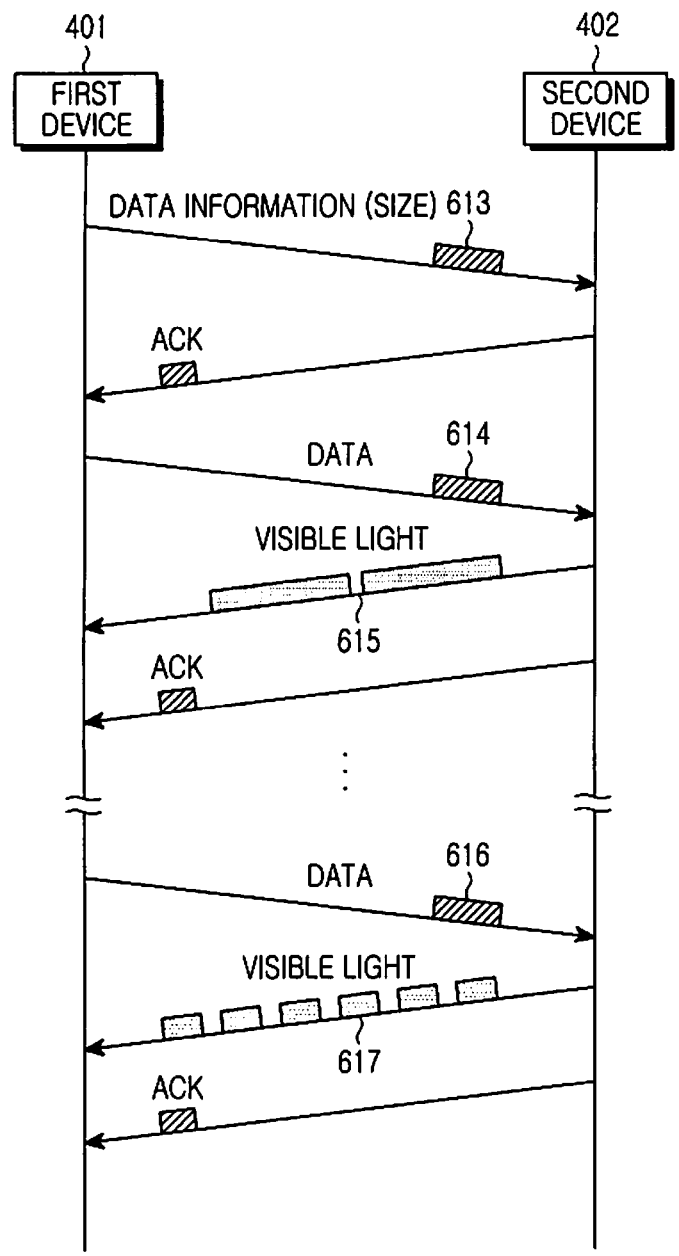

Unlike FIG. 6A, FIG. 6B shows an ACK signal transmitted separately from visible light. Steps 613 and 614 in FIG. 6B are the same as steps 413 and 414 in FIG. 4B. In FIG. 6B, if there is delay in the second device 402 in generating the ACK signal, visible light is generated separately from the ACK signal. The second device 402 generates visible light having a flickering speed as in step 615 as data is received. Upon receiving data in step 616, since the amount of received data is varied, the second device 402 generates visible light having a varied flickering interval compared with a previous flickering interval as shown in step 617.

A control process for controlling an output pattern of visible light according to the amount of received data in a receiving-side VLC device is described with reference to FIG. 7.

Figure 7:
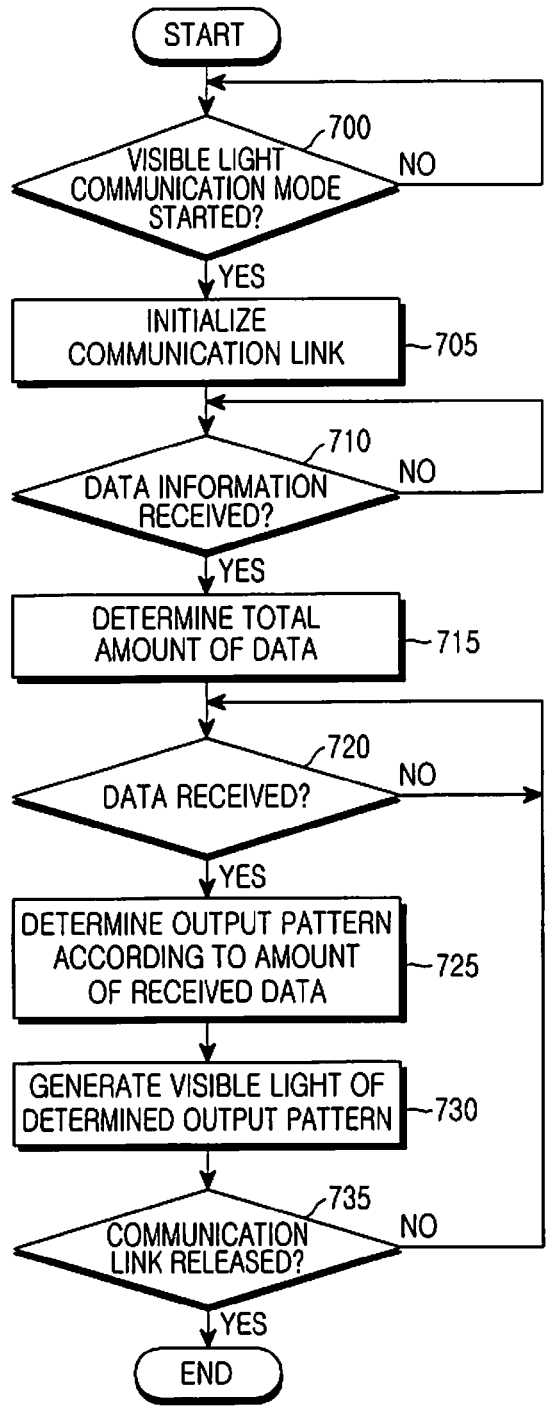
FIG. 7 is a flow chart illustrating a control process of an output pattern of visible light according to the amount of received data in a receiving-side VLC device.

Referring to FIG. 7, if a VLC mode is started in step 700, the receiving-side VLC device initializes a communication link by connecting the communication link in step 705. Next, the receiving-side VLC device determines whether data information is received in step 710. If the data information is received, the receiving-side VLC device determines the total amount of data which is to be transmitted by a transmitting-side VLC device based on the received data information in step 715. If data is received in step 720, the receiving-side VLC device determines an output pattern according to the amount of received data based on the total amount of data in step 725 and generates visible light of the determined output pattern in step 730. The receiving-side VLC device continues to receive data in step 720 unless the communication link is released in step 735. In this way, the receiving-side VLC device generates visible light of a gradually varied output pattern as the amount of received data is increased.

Hereinafter, visible signal transmission processes using a comparison of the total amount of data to the amount of transmitted/received data according to another embodiment of the present invention are described with reference to FIGS. 8 and 9.

Figure 8:
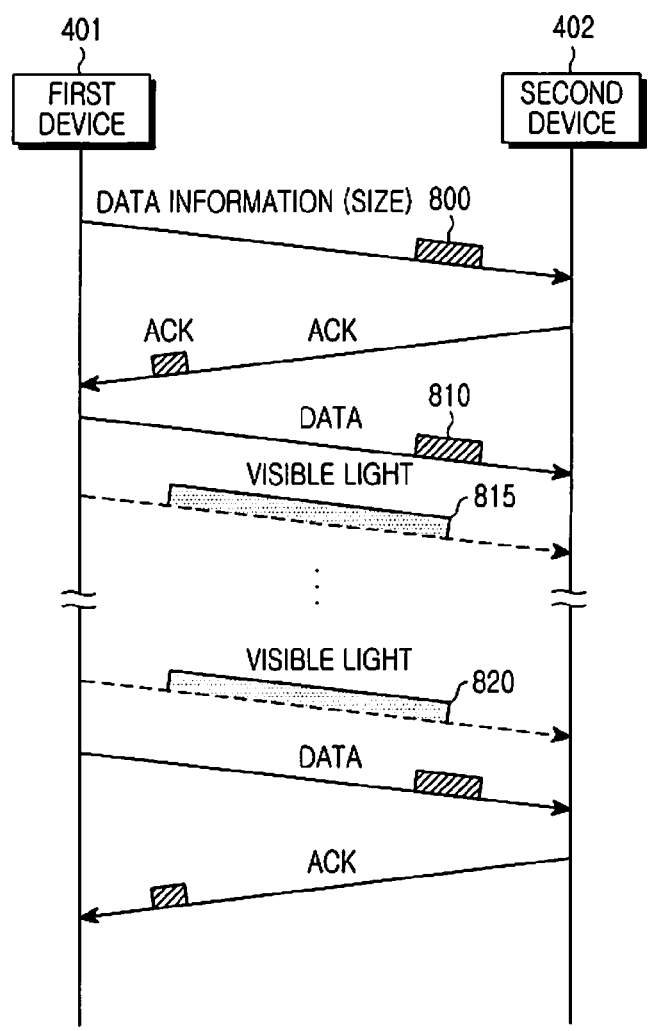
FIG. 8 is a diagram illustrating a visible signal transmission process by a comparison of the total amount of data with the amount of transmitted data in a transmitting-side VLC device according to another embodiment of the present invention.

FIG. 8 is a diagram illustrating a visible signal transmission process using a comparison of the total amount of data with the amount of transmitted data in a transmitting-side VLC device according to another embodiment of the present invention. Steps 800 and 810 are the same as steps 403 and 404 in FIG. 4A and therefore, a detailed description thereof is omitted. In FIG. 8, an output pattern of visible light becomes different according to the ratio of the amount of transmitted data to the total amount of data as in steps 815 and 820. The output pattern of visible light may be colors, brightness (or intensity) or flickering intervals of visible light as described previously.

Figure 9:
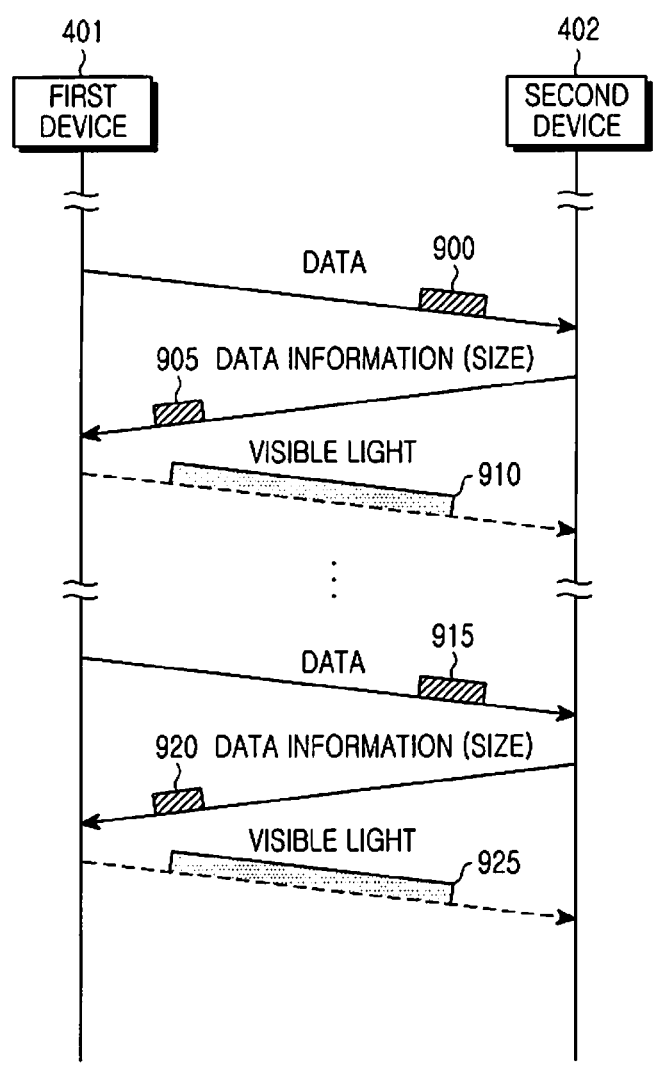
FIG. 9 is a diagram illustrating a visible signal transmission process by a comparison of the total amount of data with amount information of data received from a receiving-side VLC device according to another embodiment of the present invention.

FIG. 9 illustrates a visible signal transmission process using a comparison of the total amount of data with the amount information of data received from a receiving-side VLC device. In FIG. 9, the first device 401 transmits data to the second device 402 in step 900 and receives size information of received data from the second device 402 in step 905. The first device 401 generates visible light of different output patterns according to the ratio of the size of received data based on the received size information to the total size of data as in steps 910 and 925.

Although the certain embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the descriptions of the embodiments above, but defined by the accompanying claims and any equivalents thereof.

What is claimed is:

1. A method for generating a visible light signal in a first Visible Light Communication (VLC) device, the method comprising:

receiving data from a second VLC device;

identifying a received amount of the data that has been received from the second VLC device or a remaining amount of data that has not been received from the second VLC device based on a total amount of data to be received;

determining an output pattern of a visible light signal based on the received amount or the remaining amount;

generating the visible light signal based on the output pattern; and transmitting the visible light signal to the second VLC device based on the output pattern.

2. The method of claim 1, further comprising acquiring the total amount of data to be received from the second VLC device.

3. The method of claim 1, wherein generating the visible light signal comprises generating the visible light signal having colors that differ according to the received amount or the remaining amount.

4. The method of claim 1, wherein generating the visible light signal comprises generating the visible light signal having flickering speeds that differ according to the received amount or the remaining amount.

5. The method of claim 1, wherein generating the visible light signal comprises generating the visible light signal having color brightness that differs according to the received amount or the remaining amount.

6. The method of claim 1, wherein the visible light signal is simultaneously generated when transmitting an ACKnowledgement (ACK) signal.

7. The method of claim 6, further comprising transmitting the ACK signal irrespective of the generation of the visible light signal, if generation of the ACK signal is delayed.

8. The method of claim 6, wherein a color of the ACK signal is different from a color of the visible light signal, and not changed.

9. The method of claim 1, wherein the output pattern includes a color of the visible light signal, a flickering speed of the visible light signal, or a brightness of the visible light signal.

10. A first Visible Light Communication (VLC) device for generating a visible light signal, the first VLC device comprising:

a VLC receiver configured to receive data from a second VLC device through the VLC;

a data processor configured to:
identify a received amount of the data that has been received from the second VLC device or a remaining amount of data that has not been received from the second VLC device based a total amount of data to be received,
determine an output pattern of a visible light signal corresponding to the received amount or the remaining amount, and
generate the visible light signal based on the output pattern; and a VLC transmitter configured to transmit the visible light signal to the second VLC device based on the output pattern.

11. The first VLC device of claim 10, wherein the data processor is further configured to generate the visible light signal having colors that gradually differ according to the received amount or the remaining amount.

12. The first VLC device of claim 10, wherein the data processor is further configured to generate the visible light signal having flickering speeds that gradually differ according to the received amount or the remaining amount.

13. The first VLC device of claim 10, wherein the data processor is further configured to generate the visible light signal having brightness that gradually differs according to the received amount or the remaining amount.

14. The first VLC device of claim 10, wherein the data processor is further configured to simultaneously generate the visible light signal when transmitting an ACKnowledgement (ACK) signal in response to reception of the data.

15. The first VLC device of claim 14, wherein the data processor is further configured to control the VLC transmitter to transmit the ACK signal, irrespective of the generation of the visible light signal, if generation of the ACK signal is delayed.

16. The first VLC device of claim 14, wherein a color of the ACK signal is different from a color of the visible light signal, and not changed.

17. The first VLC device of claim 10, wherein the data processor is further configured to acquire the total amount of data to be received from the second VLC device.

18. The first VLC device of claim 10, wherein the output pattern includes a color of the visible light signal, a flickering speed of the visible light signal, or a brightness of the visible light signal.

* * * * *